(12) United States Patent
Denton, III et al.

(10) Patent No.: US 6,228,516 B1
(45) Date of Patent: May 8, 2001

(54) SELF-SWITCHING ELECTROCHEMICAL CELLS AND METHOD OF MAKING SAME

(75) Inventors: Frank R. Denton, III; Jason N. Howard; Anaba A. Anani, all of Lawrenceville, GA (US); Jose' Maria Fernandez, Sunrise, FL (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/054,010

(22) Filed: Apr. 2, 1998

(51) Int. Cl.$^7$ ............................................ H01M 2/00
(52) U.S. Cl. ............................ 429/7; 429/122; 429/61
(58) Field of Search ............................ 429/7, 8, 50, 212, 429/61, 57, 58, 122

(56) References Cited

U.S. PATENT DOCUMENTS

| | | | |
|---|---|---|---|
| 4,731,304 | * | 3/1988 | Lundquist et al. ............ 429/62 |
| 5,262,254 | | 11/1993 | Kuksbang . |
| 5,368,959 | | 11/1994 | Kuksbang . |
| 5,387,479 | | 2/1995 | Kuksbang . |
| 5,418,089 | | 5/1995 | Chaloner-Gill . |
| 5,434,021 | | 7/1995 | Fauteux . |
| 5,439,756 | | 8/1995 | Anani . |
| 5,843,592 | * | 12/1998 | Barker et al. ............ 429/50 |

OTHER PUBLICATIONS

Synthesis and Properties of Poly(phenylene vinylene)s and Related Poly(arylene vinylene)s, pp. 61–102, *Photonic Polymer Systems*, Denton et al. 1997.

Potential Dependence of the Conductivity of Highly Oxidized Polythiophenes, Polypyrroles, and Polyaniline; Finite Windows of High Conductivity, Ofer, et al, pp. 7869–7879, J. Am. Chem. Soc. 1990, 112.

* cited by examiner

*Primary Examiner*—Stephen Kalafut
*Assistant Examiner*—M. Wills
(74) *Attorney, Agent, or Firm*—Philip H. Burrus, IV

(57) ABSTRACT

Structures (1, 21, 41, 71, 161) of electrochemical cells and electrochemical cell components employ a switch-like article (10, 26, 48, 63, 65, 68, 76, 166) comprised of an electrically conducting material that becomes nonconductive or semiconductive outside of a discrete voltage window. Said switch-like article serves as a reversible, self-regulating electrochemical switch at boundary voltages, thereby protecting the cell against over-charge and or over-discharge, and can be employed in a variety of configurations to provide self-regulating cell architectures. Cell assemblies that include said switch-like articles may themselves serve an auxiliary function as switches for other cells placed in series or parallel, and for external circuits.

19 Claims, 9 Drawing Sheets

SELF-SWITCHING ELECTROCHEMICAL CELLS AND METHOD OF MAKING SAME

TECHNICAL FIELD

This invention relates in general to the field of electrochemical cells, and in particular to voltage-triggered self-regulation by electrochemical cells.

BACKGROUND OF THE INVENTION

As electronic devices increasingly become portable, advances must be made in energy storage systems to enable such portability. Indeed, it is often the case with current electronic technology that the limiting factor to portability of a given device is the size and the weight of the associated energy storage device. A small energy storage device, such as a battery, may be fabricated for a given electrical device but at the cost of energy capacity. Conversely, a long lasting energy source can be built but it is often too large or too bulky to be comfortably portable. The result is that the energy source is either too heavy or does not last long enough for a particular user's application.

Numerous different battery systems have been proposed for use over the years. Early rechargeable battery systems included lead acid, and nickel cadmium (NiCad), each of which has enjoyed considerable success in the market place. Lead acid batteries are preferred for applications in which ruggedness and durability are required and hence have been the choice of automotive and heavy industrial settings. Conversely, NiCad batteries have been preferred for smaller portable applications. More recently, nickel metal hydride systems (NiMH) have found increasing acceptance for both large and small applications.

Notwithstanding the success of the foregoing battery systems, other new batteries are appearing on the horizon which offer the promise of better capacity, better power density, longer cycle life, and lower weight, as compared with the current state of the art. The first such system to reach the market is the lithium ion battery, which has already found its way into numerous consumer products. Lithium polymer batteries are also receiving considerable attention, though they do not yet have a dominant place in the market.

Lithium batteries in general include a positive electrode fabricated of, for example, a transition metal oxide material, and a negative electrode fabricated of an activated carbon material such as graphite or petroleum coke.

The range of operating voltage for these cells is critical. If the cell is too deeply discharged below a critical lower voltage limit, some electrode materials are irreversibly damaged, reducing future cycle life. On the other hand, if the cell is overcharged beyond a critical upper voltage limit the long-term electrode performance may be compromised, and more immediately, short-circuits and or thermal runaway may occur in the cell. Because the potential violence of cell runaway reactions is commensurate with the amount of energy stored in the cells, the ability to prevent cell failures is mounting in importance as the consumer electronics industry moves toward battery cells of higher and higher energy containing flammable components. It is not unusual to find elaborate—and not inexpensive—electronic circuits to manage the electrical current and voltage cut-offs for the cell. In the ideal case the cell would regulate itself by means of reversible self-switching properties, and independently of external circuitry.

Accordingly, there exists a need for improved approaches to constrain cells to pass current only within the operating voltage in electrochemical cells. It will be appreciated that advances in the ability to control current and voltage offer advantages not just for energy storage cells, but also for other types of electrochemical devices.

BRIEF DESCRIPTION OF THE DRAWINGS

FIG. 8 may also be used to understand the choice of materials and cell architectural arrangements for self-switching cells. Using window 108 as an example, if the desired range of cell voltage falls between the voltages represented by lower limit 102 and upper limit 104, one can employ the window's conductive region as the "on" mode for current flow and the window's insulating region as the "off" mode for current flow, e.g., by employing architectures such as those shown in FIG. 2 and FIG. 3. Alternatively, if the upper end of the cell's desired operating range falls below the lower limit (102) of window 108, using an architecture as in FIG. 1 or FIG. 4, one can use window 108 as an "on" mode for shunting current applied during overcharge. On the other hand, if the lower end of the cell's desired operating range falls above the upper limit (104) of window 108, using an architecture as in FIG. 1, one can shunt some current during overdischarge to exploit window 108 as an "on" mode for signalling through a light-emitting diode that the cell needs to be recharge, or for activating a transistor to close the circuit. It will be seen that window 98 can be exploited in ways analogous to those for window 108. For instance, if it is desired to maintain the anode at an electrode potential lower than the limit represented by boundary 94, then by discharge using an architecture as in FIG. 1, window 98 can be exploited as a controller shunt to indirectly terminate current flow or warn of over.

DETAILED DESCRIPTION OF THE PREFERRED EMBODIMENT

Figure 1:
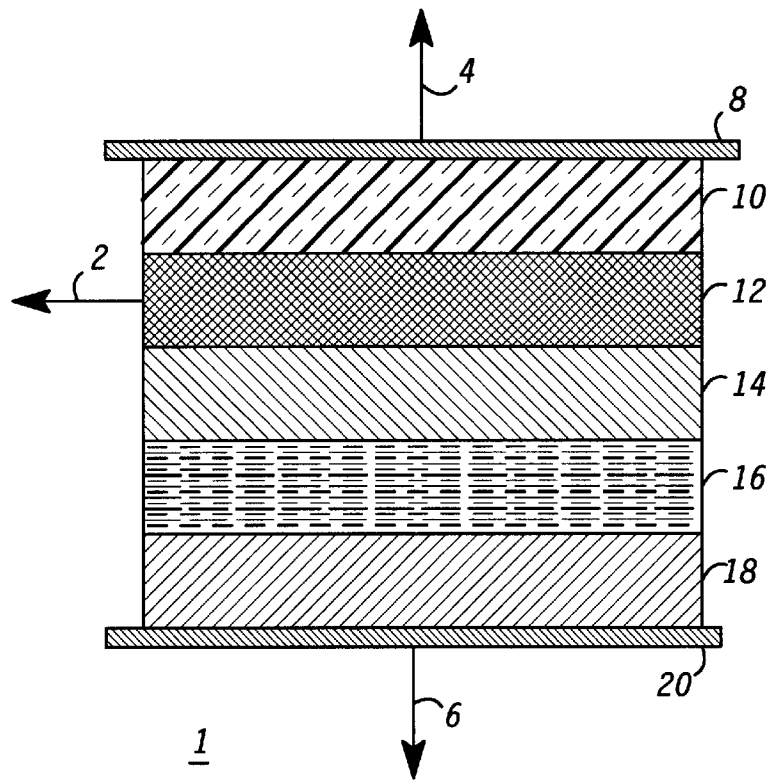
FIG. 1 is a schematic representation of an electrochemical cell (1) having an architecture in accordance with the instant invention. The cell comprises a self-switching component (10) sandwiched on one side by a first current collector (12) that is electrically connected to a circuit (2) such as a load or charging circuit, and on the other side by a second current collector (8) that is electrically connected to a shunt circuit (4). In this case, the voltage range for the "on" mode for conductivity of the self-switching component has been chosen to fall outside the desired electrical potential range of the electrode. On the opposite face of said first current collector is a first electrode (14) comprised of active material, which is exposed to an electrolyte medium (16) that also is in contact with a counterelectrode (18). Said electrode and counterelectrode may be penetrated by the electrolyte medium. Said counterelectrode is in electrical contact with a third current collector (20), which is in turn optionally exposed to said electrolyte medium (16) and said counterelectrode is also connected to a circuit (6) such as an electrical load or charging circuit.

While the specification concludes with claims defining the features of the invention that are regarded as novel, it is believed that the invention will be better understood from a consideration of the following description in conjunction with the drawing figures, in which like reference numerals are carried forward.

The instant invention places into battery cells one or more articles comprised of electrically conducting material(s) whose conductivity becomes nonconductive or semiconductive outside of a discrete, desirable voltage window, thus providing an intrinsic self-switching property. The term "semiconductive" as used here refers to electronic conductivity that is orders of magnitude below that of a material in its metallic state, but is not insulating. The self-switching component is incorporated into the cell in such a way as to serve as a gate, or optionally as a switchable shunt, for current flow in the cell. The gate (or shunt) is toggled "on" or "off" according to the intrinsic electrical potential characteristics of the self-switching material. Said switch-like article serves as a reversible, self-regulating electrochemical switch at boundary voltages, thereby protecting the cell against over-charge and or over-discharge, and can be employed in a variety of configurations to provide self-regulating cell architectures. By employing a self-switching element in the cell itself, the cell has been imparted with failsafe characteristics and may be made much more independent of external circuits, and thus the safety, utility, and affordability of the cell are increased. Examples of suitable architectures (1, 21, 41, 71, 161) for self-switching electrochemical cells employing a switch-like article (10, 26, 48, 63, 65, 68, 76, 166) are shown in the Figures.

If desired, a self-regulating cell made according to the instant invention may be placed in series and or in parallel with other cells that are not self-regulating, and thereby a cell made according to the invention can protect one or more stacks of cells in a battery. Moreover, such cells may be used either individually or in combination as switches to regulate electronic functions of an external circuit Because toggle response times of switch-like cells depend on the cell architecture, they may be designed to be as short as almost instantaneous or as long as many days. Cells with a slow toggling property permit the construction of inexpensive "slow" circuits and delayed-action switches.

Voltage is one of the most precise parameters for monitoring conditions within an electrochemical cell, and this allows one to make maximum optimal use of cell capacity while still obtaining a wide margin of safety in the cell. By contrast, it is possible to detect overcharge conditions by temperature, but heat flow within cells is inefficient and inhomogeneous, and the distribution of molecular energies at any given temperature can be represented by a bell curve. Therefore, thermal criteria are a broad and inexact measure of the state of overcharge, and thus cell manufacturers employing a thermal cut-off typically choose a threshold condition for shut-down that is well above the range of expected cell operating temperatures. For that reason, meltable porous plastic separators have been used as safety components primarily as an irreversible mechanism of last resort to prevent thermal runaway. For the opposite problem of preventing over-discharge of the cell, thermal criteria are hardly applicable as a warning mechanism. However, where voltage-triggered control is possible from the intrinsic properties of a material, the invention shows there are a variety of ways to exploit those properties to protect electrochemical cells.

A few criteria must be met when choosing self-switching materials:
1. The conductivity of the self-switching material should be able to support the desired flow of current for operation of the component comprised by it.
2. The self-switching material should possess a reversible electrical toggling capability at or near one or more desired voltage thresholds for the cell. Where the self-switching material toggles as an electrical conduit, it should become poorly conductive at overcharge and or overdischarge potentials, but conductive in the desired cell or electrode operating ranges. Where the self-switching material toggles as an electrical shunt, it should become conductive at overcharge and or overdischarge potentials, but poorly conductive in the desired cell or electrode operating ranges.
3. Chemical compatibility must be considered. For example, if the self-switching material is to be exposed continuously to electrolyte, it must be able to maintain its switching capabilities in the presence of that electrolyte.

Because of the high voltages found in typical lithium ion cell chemistries, a particularly useful class of materials for imparting switch-like performance is the electrically conducting polymer [CP] category, although the invention is not so limited. Other materials with electronic switching properties include elemental forms of Si, C (diamond), Ga, or Ge doped with small traces (e.g., 0.1% w/w usually of main-group elements) of atomic adulterants such as Ga, As, Sb, Te, Tl, Pb, Bi, Po, At, B, P, N, In, Al, Si, C, Ge, and or Be. Examples of alloy compounds that may be similarly doped to obtain switching properties include AlSb, GaP, GaAs, GaSb, InP, ZnS, and SiC. By contrast, typical CPs are organic macromolecules with highly conjugated sequences of pi bonds; some also have electrically conducting sigma bonds such as are found in silicon compounds and other materials comprised of main-group elements. There are now a large number of different conducting polymers: most of these are insulating below a threshold oxidation potential that is specific to the specific polymer, but above those thresholds they becomes either semiconducting or conducting. A still higher threshold of oxidation potential serves as the ceiling above which the polymer becomes nonconductive again. When the oxidation potential is taken to a point very far above the upper limit, the polymer becomes a permanent insulator. In several cases, electrical conductivities on an article mass basis for these polymers can equal those of copper. In addition to a unique first oxidation potential (also referred to as an ionization potential), other electron-activating and electron-conducting features used to describe the useful electronic structure of the conducting polymer include band width, band gap and electron affinity, with definitions comparable to those employed in traditional solid-state physics. The use of electrochemical oxidation to render CPs conducting is described as p-doping; in addition, some CPs may also become conductive by electrochemical reduction, or n-doping. Note that p-doping and n-doping for conducting polymers are reversible and are commonly exploited in a range as high as 10 weight % incorporation of dopant This is in contrast to the doping employed for inorganic semiconductors, which is a permanent inclusion during synthesis, and incoporates perhaps 0.1% of elemental dopant. While many examples of electrochemical oxidation in non-aqueous electrolyte media are known, it is also possible to dope such polymers by exposure to various acids or strong alkali, and it is possible to dope conducting polymers such as polyaniline electrochemically in aqueous electrolyte media.

Conducting polymers have been used in a variety of cell-related functions, for instance as electrodes for small commercial lithium ion cells. In particular, the ability of CPs to reversibly intercalate anions has qualified them for use as positive electrode materials, but they have also been employed in negative electrodes, intercalating lithium cations or tetraalkyl ammonium ions, for instance. Because of their high intrinsic capacity and rapid surface reactions, conducting polymers have also been used as electrodes for electrochemical capacitors (for instance, in U.S. Pat. No. 5,439,756).

In addition to these uses, conducting polymers have been employed as corrosion inhibitors on battery current collectors (U.S. Pat. No. 5,262,254 and U.S. Pat. No. 5,387,479); as the current collector itself (U.S. Pat. No. 5,368,959); as protection against lithium dendrite growth (U.S. Pat. No. 5,434,021); and as conduction-enhancing additives in electrodes (U.S. Pat. No. 5,418,089). Certain conducting polymers have been used as the luminous element in light-emitting diodes (for instance, see the following review: F. R. Denton, III, and P. M. Lahti, "Synthesis and properties of poly(phenylene vinylene)s and related poly(arylene vinylene)s"; *Photonic Polymer Systems*; Wise, Wnek, Trantolo, Cooper, Gresser, eds., Marcel Dekker, Inc, N.Y., 1998, (Chapter 3), pp. 61–102). It has also been reported that CPs may be put to use in three-electrode configurations as transistors (cf. D. Ofer, R. M. Crooks, and M. S. Wrighton, "Potential Dependence of the Conductivity of Highly Oxidized Polythiophenes, Polypyrroles, and Polyaniline: Finite Windows of High Conductivity," *Journal of the American Chemical Society*, 1990, 112, 7869–7879).

Synthetic control of conducting polymer chemical structure has now advanced to the point where they may be synthesized by facile and inexpensive means with readily customizable chemical features so as to tailor the electronic energy states to a quantum set that is compatible with the contemplated application. CPs may be fabricated readily as articles with select form factors. And if desired, CPs may be formed by in situ polymerization in electrochemical cells from monomers in electrolyte solution. CPs may serve as switches if modestly high potentials are applied in the presence of electrolyte media (e.g., 4V). Alternatively, CPs may serve as switches if very high voltages (e.g., 100V across a 1-micrometer-thick film) are applied even in the absence of electrolyte: some CPs are made luminous by this mechanism such that they serve as light-emitting diodes [LED's]. Reservoirs of electrolyte serve as sources of intercalatable counterions so that electrochemical ion "doping" (to make the material conductive) and ion "de-doping" (to make the material insulating) can occur.

Examples of CPs with convenient voltage windows for conduction are polythiophene (3.8 to 4.8V); polypyrrole (3.3 to 4.3V); polyaniline (3.2 to 4.0V); and poly(3-(4-fluorophenyl)-thiophene) (0.5 to 1.5V and 3.8 to 4.8V: two ranges, the lower one representing conduction induced by electrochemical reduction). These potentials as presented here are relative to that of lithium metal (0.0V), and represent typical ranges observed in lithium ion cell electrolyte media such as dialkyl or cyclic organic carbonates and or glymes, wherein a typical dissolved salt and concentration is 1M $LiPF_6$. However, potentials vary somewhat with the choice of electrolyte media and analytical electrode material. Some other polymers that may be used particularly at higher voltages include: polyphenylene; poly(phenylene vinylene), which fluoresces at high voltage; and polyacetylene.

The cells that will be protected by these and other self-switching materials commonly have a negative energy storage electrode, a positive energy storage electrode, and an electrolyte medium. For a cell derived from lithium ion chemistry, the negative energy storage electrode is typically comprised of active materials that can intercalate or alloy with lithium atoms at relatively low potentials. These active materials include graphite, coke, amorphous carbon, buckminsterfullerenes, metallic lithium, lithium alloys (e.g., with silicon, aluminum, or magnesium), lithium titanium sulfide, lithium titanium oxide, lithium tin oxide, and combinations thereof. The positive energy storage electrode for such cells is typically comprised of active materials that can at relatively high potentials de-intercalate lithium ions, or intercalate anions, or react to form lithium salts. These materials include lithium cobalt oxide, lithium manganese oxide, lithium nickel oxide, graphite, coke, amorphous carbon, lithium titanium sulfide, lithium molybdenum sulfide, lithium titanium oxide, poly(organic disulfides) (e.g., poly(2,5-dimercapto-1,3,4-thiadiazole)), polypyrrole, polythiophene, polyphenylene, poly(phenylene vinylene), polyacetylene, and combinations thereof. Note that some negative electrode energy storage active materials listed above are the same as some positive electrode energy storage active materials listed above: in some cases the cell may even be constructed with a symmetric pair of energy storage electrodes.

Also note that some self-switching materials listed above are the same as some positive electrode energy storage active materials listed above. However, the qualities that make one article suitable for use in dense storage of lithium ion may be less suitable for a self-switching article, thus even for articles comprised of the same material, if their purpose is different, their respective morphologies may need to be tailored differently. For instance, long-chain, closely packed crystallites of a conducting polymer favor surface conduction and higher electrical currents, while a shorter-chain, loosely packed amorphous phase of the same polymer permits more efficient intercalating and de-intercalating of ions as an electrode active material at the expense of current.

Some of the electrode active materials (e.g., graphite) are highly conductive, in which case a path for electron flow is provided by their intrinsic properties, while in other cases the electrode active material is a poor conductor (e.g., the poly(organic disulfides)). However, self-switching materials when used either as encapsulants or as electrical conduits to particles of active material, allow the native capacity of both the highly conductive active materials and the more poorly conductive active materials to be used efficiently. Electrical contact with the electrode particles can be obtained either through the current collector itself, or through the flow of current through conducting particle of active material (or additives to active material, such as black carbon), or through a medium that is added to the cell for that purpose. Thus there are several points at which an article of self-switching material may be employed to control the flow of current to the particles of active material.

The active materials may be fabricated into a free-standing article, but are often disposed upon a current collector comprised of a highly conducting material such as a metal or an electrically conductive carbon. The current flow to and from the current collector is typically concentrated into tabs or wires also comprised of a highly conducting material such as a metal or an electrically conductive carbon. It is often but not always easier to bond to carbon substrates (substrates are also called current collectors and sometimes called electrical leads) to achieve an efficient electrical interface. This fact is convenient, for instance, in bonding self-switching materials to carbon-comprised substrates. Because what is important is the availability of an electrical current path (as opposed to the actual location of bonding), self-switching materials can also be exploited by bonding to active material (e.g., amorphous carbon) or other electrode solids instead of the substrate itself, and yet can still control the flow of current to the substrate. Thus the phraseology used here employs the terms "conduit" or "transmission line" to refer to an article that provides a critical and controlling conductive path at any point in the cell. The term "primary conduit" refers to an article through which flows most or all of the electronic current transferred through a second article under discussion. The term "electrical contact" as used here refers to the fact that an electron-conducting pathway exists between two articles under discussion even if they are not actually in direct physical contact.

Typical electrolytes for lithium ion chemistries comprise a salt such as $LiPF_6$, $LiAsF_6$, $LiCF_3SO_3$, $Li(CF_3SO_3)_2N$, $Li(CF_3SO_3)_3C$, $LSF_6$, $LiClO_4$, LiI, LiBr, LiCl, LiF, or the like. The electrolyte medium in which the salt is dissolved may contain one or more of the following as well as their derivatives: ethylene carbonate, propylene carbonate, diethyl carbonate, dimethyl carbonate, methyl ethyl carbonate, tetrahydrofuran, gamma-butyrolactone, acetonitrile, dimethylsulfoxide, dimethylformamide, hexamethylphosphoramide, glymes, poly(ethylene oxide), poly(propylene oxide), poly(vinylidene fluoride), polyesters, polyurethanes, polysiloxanes, and other other polymers. Aqueous and alcoholic solutions have also been used. Because for cells containing an electrolyte medium it is pervasively present in the cell, a self-switching article must remain stable—that is to say, must retain its functionality—wherever the self-switching article has a common interface with an electrolyte medium. Additionally, an elementary principle is that both the negative and positive energy storage electrodes must be in contact with the same reservoir of electrolyte or dielectric material in order to cycle electrochemically. In order to be employed as independent voltage sensors for the cell, any separate additional electrodes (i.e. third or higher electrodes) in the cell must also have exposure to the electrolyte and be capable of ionic exchange with the electrolyte medium. The terms "exposure to" and "(physical) contact with" an electrolyte medium as used here denote an intimate interface that permits the exchange of ions if the electrolyte-exposed or—contacted electrode comprises an ion-exchangeable substance whose ion-interchange capacity is the basis for the cell's energy storage. Non-independent voltage sensors may be fabricated without this electrolyte exposure and without the ion exchange requirement, for instance, by placing an electrical conductor in electrical contact with the negative and positive electrode.

Alternatively, with a dielectric material one has a medium that may exchange electrons and or ions only at a high electrical breakdown potential. Such materials are employed between electrode and counterelectrode in a dielectric capacitor in a manner that mimics an electrolyte medium, in the sense that it allows the build-up of charge between the electrodes and short-circuits only at potentials outside the desired operating range for the cell. Thus one may construct cell architectures substituting a dielectric material for the electrolyte medium in fabricating, for example a self-switching dielectric capacitor cell. From this it should be understood that the use of the term "electrolyte medium" here is not exclusive of dielectric material in cells that are based upon solid-state capacitance for their energy storage mechanism; and the invention is indusive of such devices.

The following examples illustrate some salient features of the invention:

EXAMPLE 1

3-Electrode Cell with Voltage-activated Electrical Shunt

Referring now to FIG. 1, a component (10) comprised of self-switching material is placed as a bridge between a positive current collector (12) and electrical shunt (8) leads in order to reversibly bleed off the unwanted current through a drain circuit (4) during overcharge. The voltage window of conductivity for the bridge is designed to lie above and optionally slightly overlapping the desired ceiling for the range of operating voltage of the electrode. For this type of architecture, the bridge serves as a self-regulating reversible shunt switch for surplus current when the voltage falls outside the desired cell operating range. Also, with its three- (or more-) electrode configuration, the cell assembly behaves as a transistor. Self-switching component 10 is comprised of polypyrrole, which is conductive in the range 3.3 to 4.3V. Negative electrode 18 is comprised of lithium metal; and positive electrode 14 is comprised of $V_6O_{13}$; and the electrolyte (16) is comprised of 1M $LiPF_6$ in a 50:50 (v/v) mixture of ethylene carbonate and diethyl carbonate; the cell is electrochemically cycled in the range 1.4 to 3.2V. At cell voltage of 3.3V (overcharge regime), the conducting polymer is pdoped, the electrical shunt is activated, and charge is diverted.

EXAMPLE 2

3-Electrode Cell with Voltage-activated Over-discharge Signal

A cell is constructed as in Example 1, except that self-switching component 10 is comprised of poly(3-(4-fluorophenyl)-thiophene), which has conductivity windows between 0.5 and 1.5V (i.e., n-doped) versus metallic lithium, and between 3.8 and 4.8V (i.e., p-doped) versus metallic lithium. In this case the lower-voltage window is exploited: when the cell voltage drops below 1.5V, the conducting polymer is n-doped, the electrical signal to circuit 4 is activated, and a warning light on a light-emitting diode notifies the user that the cell capacity is near exhaustion. Alternatively, the signal can be used as a feedback transmission to instruct an external circuit to open the circuit for the load in series with the cell.

EXAMPLE 3

3-Electrode Cell with Voltage-activated Electrical Shunt

A cell is constructed as in Example 1, where electrode 14 comprises $LiTiS_2$ (the negative electrode in this case), and counterelectrode 18 comprises $LiNiO_2$ (the positive electrode in this case), and self-switching component 10 comprised of poly(3-(4-fluorophenyl)-thiophene) as placed the bridge between current collector and electrical shunt leads (to reversibly bleed off the unwanted current through a drain electrode during overcharge). Normally the full cell will cycle between ca. 0 and 2.7V, which corresponds respectively to an electrical potential range between 3 and 1.5V versus a lithium metal reference electrode for the $LiTiS_2$ negative electrode; and the same full cell voltage range corresponds respectively to an electrical potential range between 3 and 4.2V versus a lithium lithium metal reference electrode for the $LiNiO_2$ positive electrode. When the full cell begins to overcharge (i.e., $LiTiS_2$ potential <1.5V versus lithium metal reference), self-switching component 10 is electrochemically n-doped, becomes conducting, and activates the electrical shunt circuit.

EXAMPLE 4

2-Electrode Cell with Voltage-activated Reversible Fuse

Figure 2:
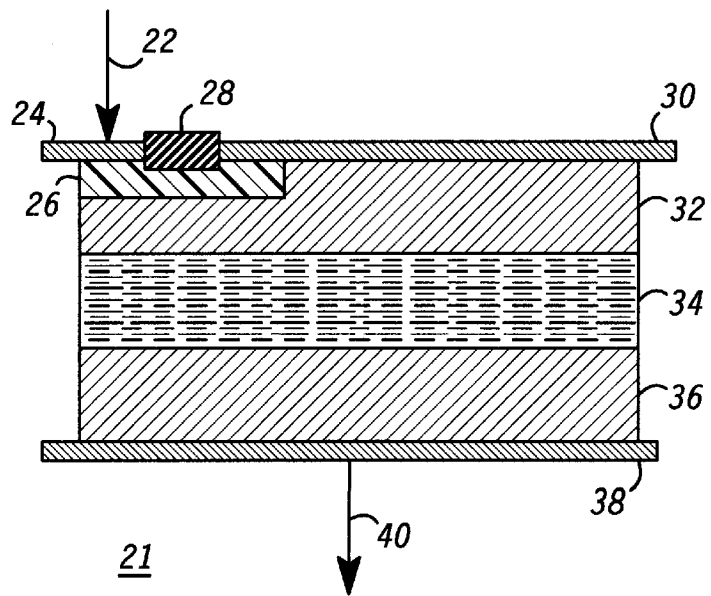
FIG. 2 is a schematic representation of an electrochemical cell (21) having an architecture in accordance with the instant invention. Current passes through a circuit (22) such as a load or charging circuit to an electrical lead (24) that is electrically insulated from the bulk of a first current collector (30) by an insulating article (28). A self-switching component (26) bridges the electrical lead (24) and the first current collector (30) to serve as an electrical transmission line between them when the switching property of the self-switching component (26) permits. In this case, the voltage range for the "on" mode for conductivity of the self-switching component has been chosen to overlap the desired electrical potential range of the electrode. In electrical contact with the first current collector and optionally with the self-switching component is a first electrode (32) comprised of active material, that also is in contact with a counterelectrode (36). Said counterelectrode is in electrical contact with a second current collector (38), which is in turn connected to a circuit (40) such as an electrical load or charging circuit. Said first electrode (32), said counterelectrode (36), and optionally said self-switching component (26) are exposed to (and, for instance, may be penetrated by) an electrolyte medium (34).

Referring now to FIG. 2, a component (26) comprised of self-switching polypyrrole material is placed as a bridge between an electrode current collector (30) and an electrical charge lead (24), where current collector 30 and electrical lead 24 are electrically insulated (e.g., by insulator 28). The electrode 32 is comprised of $LiCoO_2$ (full electrochemical cycling range 2.8 to 4.3V versus lithium metal reference), the counterelectrode 36 is comprised of coke carbon (full electrochemical cycling range 1.0 to ca. 0.0 versus lithium metal reference); and the electrolyte is comprised of 1M $LiPF_6$ in a 50:50 (v/v) mixture of ethylene carbonate and diethyl carbonate. The polypyrrole comprised article restricts cycling to the range 3.3 to 4.3V versus a lithium metal reference, reversibly becoming poorly conducting and effectively opening the cell circuit outside of that range, like a reversible fuse. Upon "hard" overcharge (e.g., exposure to 20V applied potential), the fuse opens irreversibly. It will be noted that while the polypyrrole voltage-activated "on" range overlaps the accessible voltage range for cell cycling, in fact the polypyrrole range is somewhat narrower, offering an added margin of control in this case. The cell assembly itself behaves as a hybrid combining the properties of a reversible fuse and a capacitor or battery.

EXAMPLE 5

2-Electrode Cell with Voltage-activated Electrode

Figure 3:
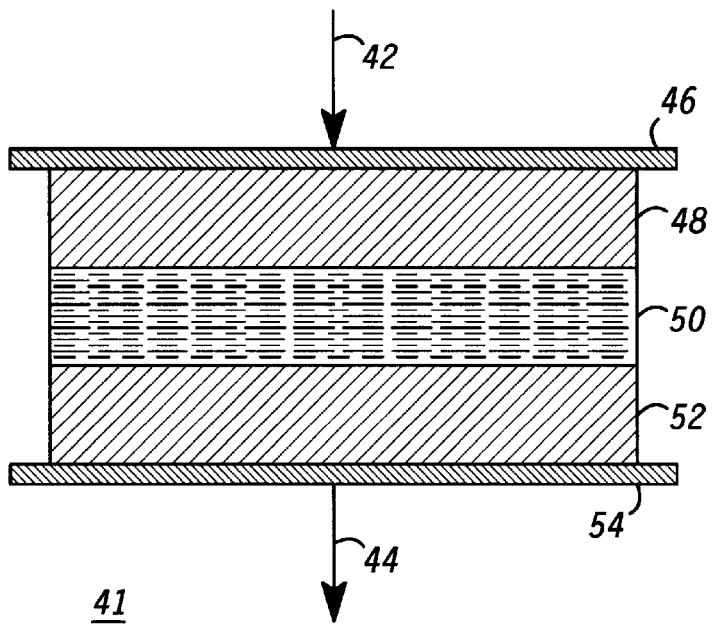
FIG. 3 is a schematic representation of an electrochemical cell (41) having an architecture in accordance with the instant invention. Current passes through a circuit (42) such as a load or charging circuit to a first current collector (46). In electrical contact with the first current collector is an electrode (48) comprised of active material and a self-switching component material such that the self-switching component material serves as the electronically conducting network between pieces of active material within the electrode and or between said first current collector and the rest of the electrode. In this case, the voltage range for the "on" mode for conductivity of the self-switching material has been chosen to overlap the desired electrical potential range of the electrode. Said first electrode is exposed to and may be interpenetrated by an electrolyte medium (50). A counterelectrode (52) is also exposed to and may be interpenetrated by said electrolyte medium. Said counterelectrode is in electrical contact with a second current collector (54), which is in turn connected to a circuit (44) such as an electrical load or charging circuit.
Figure 4:
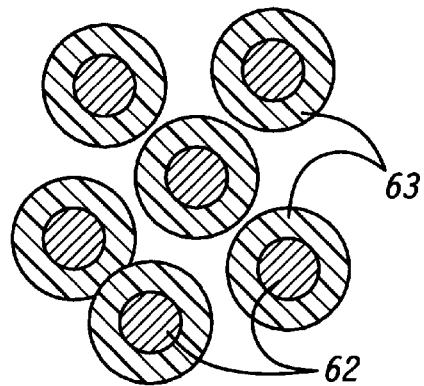
FIG. 4 is a schematic representation of a materials configuration in accordance with the instant invention, such as might be found in an electrode (48) in FIG. 3. Particles of an electrode active material (62) are encapsulated in a self-switching component material (63) in such a way as to permit ion exchange by said particdes of active material. However, electronic current can flow to or from said particles of active material only within the voltage range for which said self-switching component material is electronically conductive.

Referring now to FIG. 3, an electrode (48) comprises particles of an active material inner core of solid $LiMnO_2$, each particle being encapsulated in a porous self-switching polypyrrole material. Such an encapsulation is depicted in FIG. 4. The counterelectrode (52) is comprised of lithium metal, and the electrolyte (50) is comprised of 1M $LiPF_6$ in a 50:50 (v/v) mixture of ethylene carbonate and diethyl carbonate; the same electrolyte medium penetrates electrode 48. The polypyrrole encapsulator confines electrochemical cycling of the manganate material to cell voltages between about 3.3 and 4.3V, becoming poorly conducting outside that range.

Figure 5:
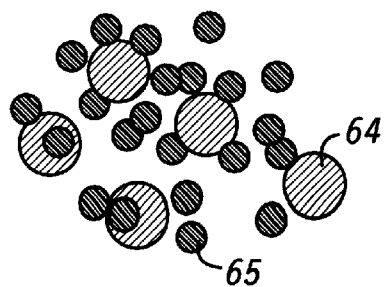
FIG. 5 is a schematic representation of a materials configuration in accordance with the instant invention, such as might be found in an electrode (48) in FIG. 3. Current is passed to particles of an electrode active material (64) through a network of co-mingled particles that comprise a self-switching component material (65). Ion exchange by said particles of active material is permitted, but electronic current to or from said particles of active material occurs primarily only within the voltage range for which said self-switching component material is electronically conductive.
Figure 6:
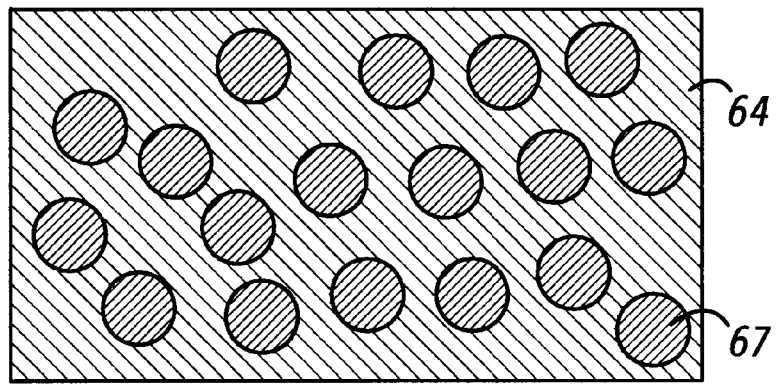
FIG. 6 is a schematic representation of a materials configuration in accordance with the instant invention, such as might be found in an electrode (48) in FIG. 3. Current is passed to partides of an electrode active material (67) embedded in a medium that comprises a self-switching component material (65). The embedding medium permits ion exchange by said particles of active material, and may do so by virtue of a native ion conductance property, by extensive porosity that permits penetration of an electrolyte medium, or by other means. However, electronic current to or from said particles of active material occurs primarily only within the voltage range for which said self-switching component material is electronically conductive.

Some other examples of suitable contiguous relationships for materials placement in the electrodes to support these properties are shown in FIGS. 5 and FIG. 6: alternative configurations such as checkerboard patterns, stripes, and other arrangements in which active electrode materials alternate with self-switching conductive materials will occur to those skilled in the art. Our use of the term 'contiguous' should not be construed to mean completely sealing off the inner material from the environment by the outer coating material, but rather we mean to indicate that one material coats the other in such a way that the inner material is still exposed to the electrolyte medium. For instance, it is important that lithium ion electrode active materials be able to exchange lithium ions with the electrolyte media, thus it is important that the electrically gating material be configured in such a way as to permit ion exchange by the electrode active material. Porosity of the electrically gating coating allows for electrolyte interaction with the active material surface, while the communication of electrode charge state primarily through the sheath/gate material confines current flow during charge and discharge to a preferred voltage range. In this case, the voltage window of conductivity for the porous coating/interface is chosen to overlap with the desired range of operating voltage of the electrode. In this variation of the architecture, the sheath or electrical interface material for each particle acts as a transistor or reversible voltage-triggered fuse, shutting off the current under over-discharge or mildly overcharging conditions. For a "hard" overcharge, the encapsulating bridge material may act as a permanent shutdown fuse (e.g., if the bridge is comprised of conducting polymer materials). Cells with this configuration behave as varistors under overcharge conditions, particularly if a current collector has a monolithic coating of the switch-like coating between it and the active material particles.

EXAMPLE 6

2-Electrode Cell with Voltage-activated, Reversible Short-circuit

Figure 7:
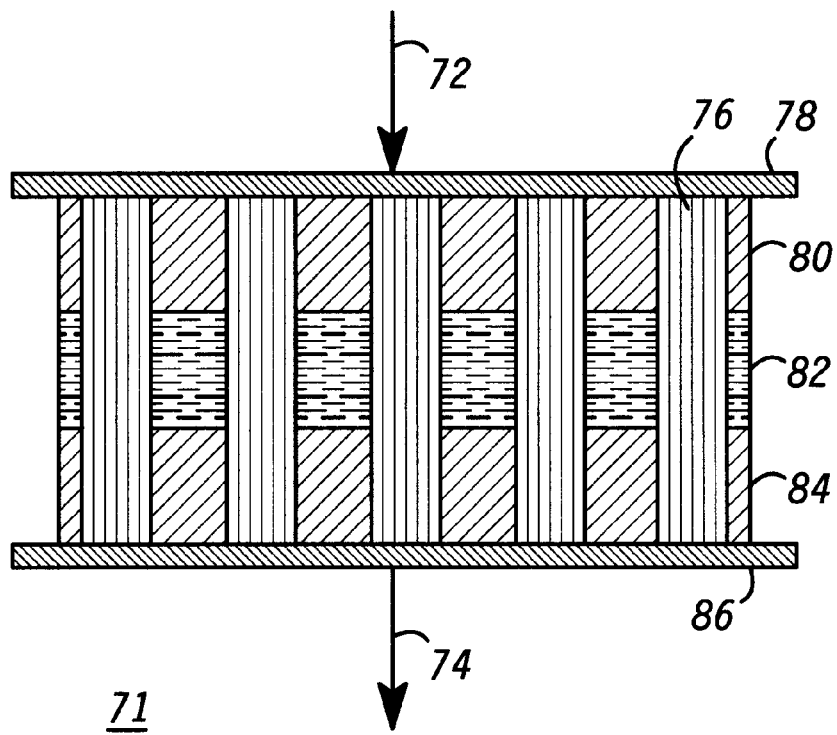
FIG. 7 is a schematic representation of an electrochemical cell (71) having an architecture in accordance with the instant invention. The cell comprises a first current collector (78) that is electrically connected to a circuit (72) such as a load or a charging circuit. On one or more faces of said first current collector is a first electrode (80) comprised of active material, said first electrode being exposed to an electrolyte medium (82) that also is in contact with a counterelectrode (84). A second current collector (86) is in electrical contact with the counterelectrode and also with a circuit (74) such as a charging circuit or load circuit. One or more articles comprised of self-switching material span the the cell to provide a bridge (76) between either said first current collector or said first electrode and either said second current collector or said counterelectrode, and said bridge is optionally exposed to said electrolyte. In this case the voltage range within which the bridge is electronically conductive is chosen to lie above the desired voltage operating range of the cell, thus currents applied during overcharge are shunted through the bridges.

Referring now to FIG. 7, self-switching bands of material (76) comprised of polythiophene is sandwiched as a bridge between an electrode (80) comprising $LiMnO_2$ and a counterelectrode (84) comprising graphite, across an electrolyte (82) comprised of 1M $LiPF_6$ in a 50:50 (v/v) mixture of ethylene carbonate and diethyl carbonate. The bridging bands reversibly short-circuit the opposite electrodes above a full cell voltage of about 3.8V, preventing the cell from being charged to a dangerous level. In this case the voltage window of conductivity for the bands somewhat overlaps the desired ceiling for the range of operating voltage of the cell. In normal cell operation, the bridge is insulating, but under overcharge conditions a conducting region appears in the bridge emanating from one or both electrodes: the conductive region grows until the bridge short-circuits the electrodes, allowing the current to pass harmlessly through the cell at a safe voltage. Such a bridge during overcharge behaves like a reverse-biased diode and with the appropriate choice of self-switching material, may even be exploited as an internal light-emitting diode, thereby serving as an overcharge warning beacon if part or all of the cell housing is transparent. An example conducting polymer useful for light-emitting characteristics is poly(paraphenylene vinylene) and its derivatives. Also, the overcharged cell assembly corporately behaves as a reverse-biased diode being held above its electrical breakdown threshold.

EXAMPLE 7

3-Electrode Cell with Voltage-activated Feedback Element

Referring now to FIG. 1, a self-switching component 10 comprising polypyrrole is placed as a bridge between current collector 12 and electrical feedback lead 8 to reversibly toggle drain current to an external shunt circuit 4 for a 50 mAh-capacity cell. Electrode 14 comprises $LiNiO_2$, counter electrode 18 comprises coke carbon, and electrolyte 16 comprises 1M $LiPF_6$ in a 50:50 (v/v) mixture of ethylene carbonate and diethyl carbonate. Current from charger current source 2 is modulated by the circuit to provide an initial trickle current, 1 mA. The resulting trickle current through 4 when it is conductive (i.e., between 3.3 and 4.3V cell voltage) is used as a feedback signal by an amplifier segment of supply circuit 2, triggering the supply of 50 mA current to the cell. When the cell voltage becomes too high, self-switching component 10 becomes poorly conductive, feedback current falls to near zero, and the current fall-off is registered in circuit 2, which terminates the flow of current to the cell.

Figure 8:
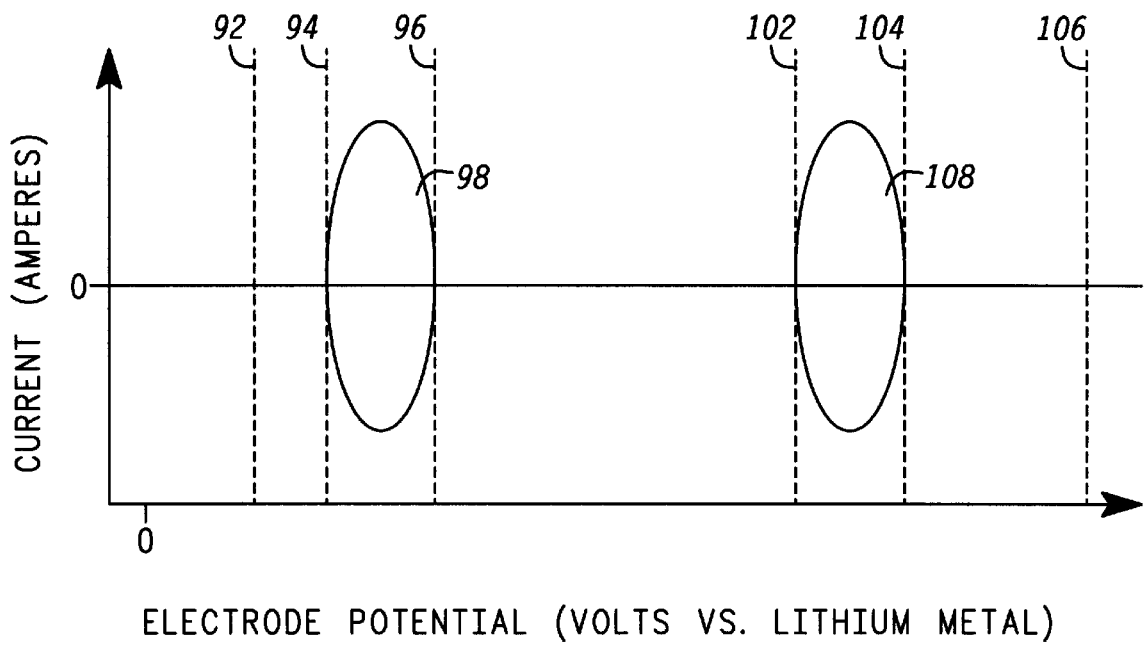
FIG. 8 is a generic graph illustrating some attributes of electronically switching materials that may be employed in implementing the instant invention. Conductivity "windows" (98, 108, respectively) have lower voltage boundaries (94, 102, respectively) and upper voltage boundaries (96, 104, respectively), outside of which the switching materials becomes insulating or semiconductive. The term semiconductive as used here refers to electronic conductivity that is orders of magnitude below that of a material in its metallic state, but is not insulating. As shown here, the material is approximately insulating outside of its conductivity windows. Conductivity windows are dependent upon the self-switching materials employed, which determine a conductivity window's shape, dimension, and location along the voltage curve. In some cases more extreme voltages may cause self-switching materials to become permanent insulators or permanent weak semiconductors: this would occur at voltages below the lower stability threshold (92) or above the upper stability threshold (106). While some self-switching materials have two conductivity windows, for instance with one (98) being associated with electrochemical reduction and the second (108) with electrochemical oxidation, other materials exhibit only one such window.
Figure 9:
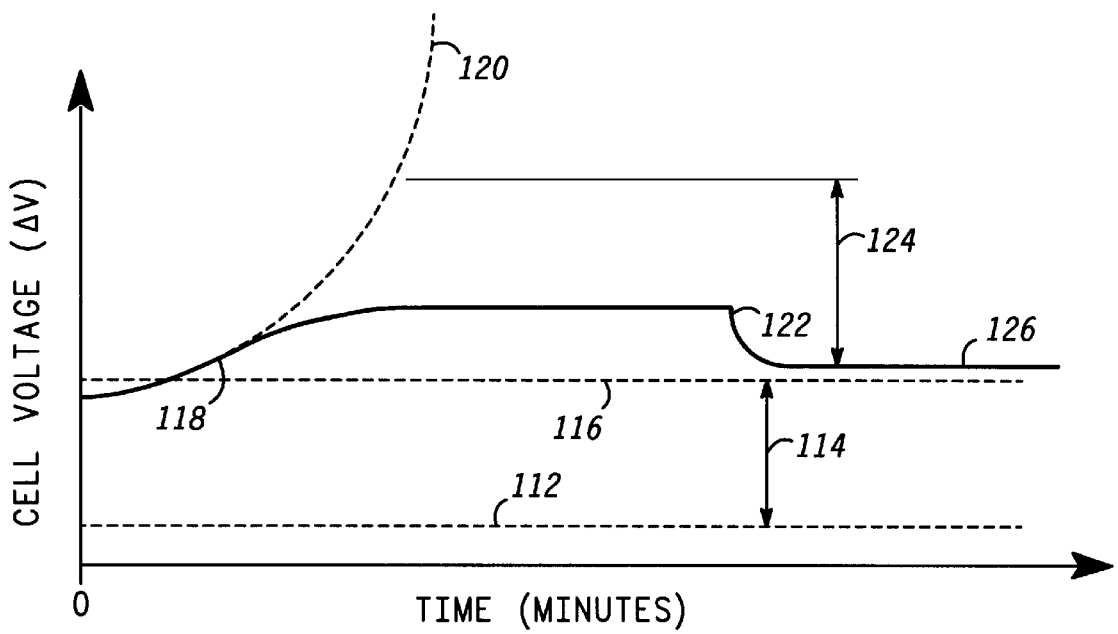
FIG. 9 schematically illustrates the behavior of electrochemical cells without self-switching properties during overcharge, and the behavior of analogous electrical cells possessing architectures and self-switching components in accordance with the present invention. Voltage range 114 is bounded by preferred minimum cell voltage 112 and preferred upper cell voltage 116. When the cell without self-switching properties is overcharged, its voltage rises rapidly as shown by dashed line 120. However, if the current is shunted by a self-switching component, whose voltage range for the "on" conductive mode is illustrated by double-ended arrow 124, then the cell voltage rises to a switching potential (118), above which the charged current is shunted to a drain circuit by said self-switching component and the voltage reaches a plateau as shown by the solid line. Once the charging current is terminated (122) at some later point, the cell voltage falls to an equilibrium voltage (126) and the self-switching material again becomes non-conductive.
Figure 10:
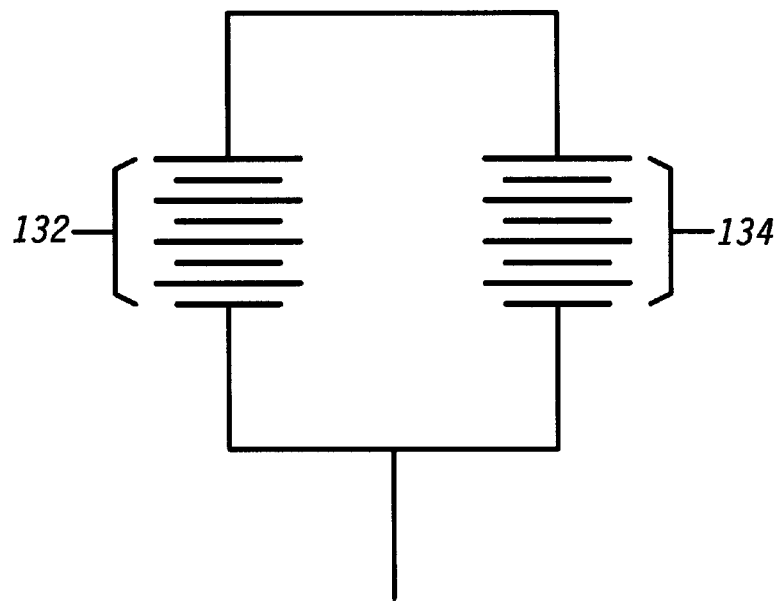
FIG. 10 schematically depicts an electrical circuit comprising the use of a series (134) of electrochemical cells fabricated in accordance with the present invention, and used to prevent overcharge in a parallel stack (132) of cells that were not fabricated according to the present invention. Each cell in stack 104 is configured as in FIG. 4, and charging current for both stack 132 and stack 134 is shunted through the self-switching components of stack 134 during overcharge.
Figure 11:
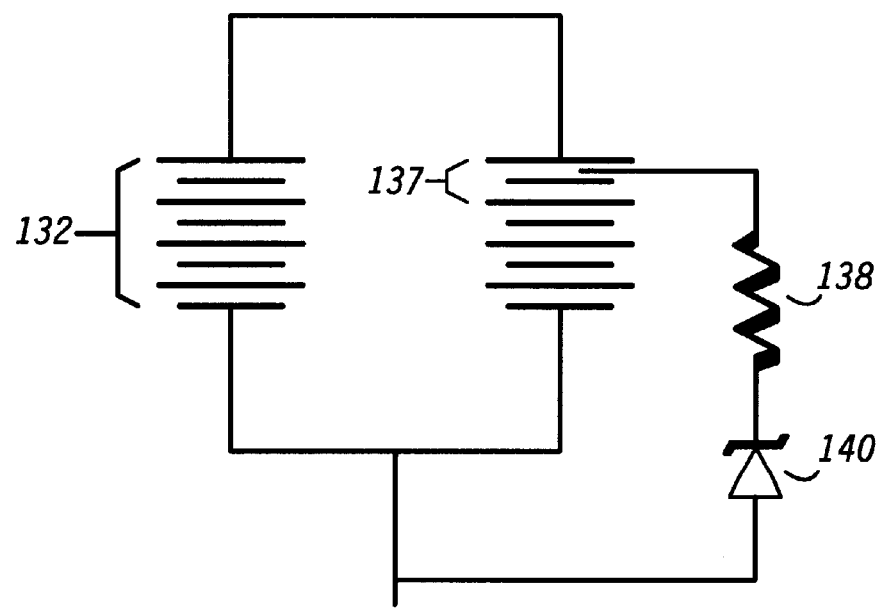
FIG. 11 schematically depicts a circuit that has a single electrochemical cell (137) fabricated in accordance with the present invention, said cell being used to control in parallel a serial stack (136) of cells that were not fabricated according to the present invention, in parallel with an electrical shunt. In the series headed by cell 137, it also controls cells that have not been fabricated according to the present invention. In this circuit configuration, resistor 138 optimizes the reverse breakdown voltage for a zener diode (140) used in shunting the current, e.g., at overcharge. Cell 137 utilizes a three-electrode configuration to shunt current, such as is depicted in FIG. 1.
Figure 12:
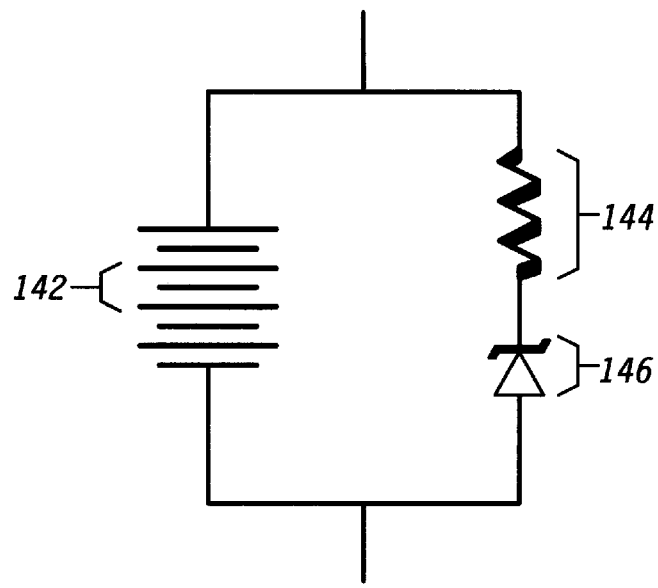
FIG. 12 schematically depicts an electrical circuit that has a single electrochemical cell (142) fabricated in accordance with the present invention, said cell being placed anywhere in a series that contains cells not made according to the present invention, with a parallel shunt. Cell 142 effectively opens the circuit for the stack at overcharge, thereby causing charging current to be shunted through parallel circuit elements, here shown as a resistor (144) and zener diode (146). Cell 142 is constructed in a configuration such as one shown in FIG. 2 and FIG. 3.
Figure 13:
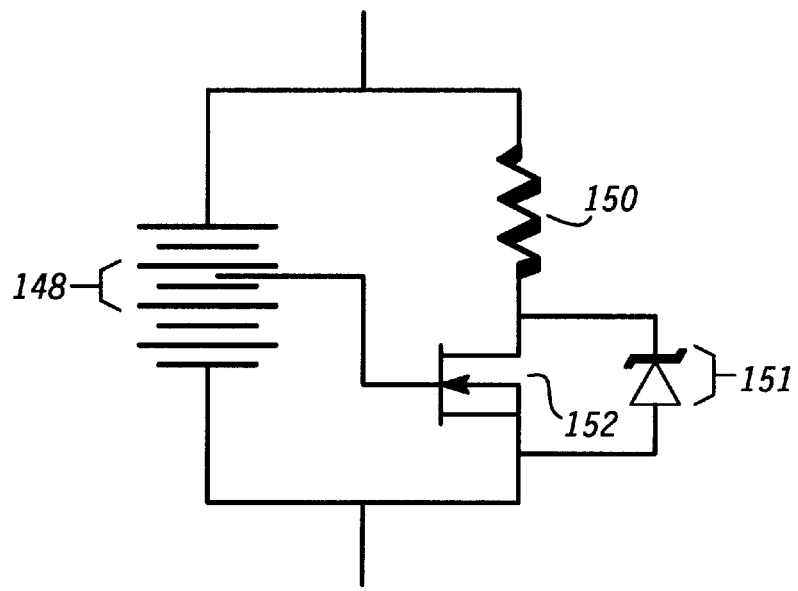
FIG. 13 schematically depicts an electrical circuit that has a single cell (148) fabricated in accordance with the present invention, said cell being placed anywhere in a series that contains cells not made according to the present invention, in parallel with a shunt circuit (150, 151, 152). Upon overcharge, current is shunted through circuit elements 150 and 151: circuit element 152 acts as a parallel release valve for safety redundancy. Cell 148 has a switching architecture such as that shown in FIG. 1.

Now considering the effect of applied current and voltage, the intrinsic properties of the self-switching material are illustrated in FIG. 8. When the material is comprised by a switching component in an electrochemical cell, a gating behavior is obtained, as illustrated by FIG. 9: this voltage profile can be obtained either by gating or shunting the cell current. For instance, when the toggle component opens a current shunt, during overcharge the cell voltage remains at levels only slightly above the typical cell operating range. A shunt that operates like a reverse-biased diode to toggle a short-circuit can also be used to protect cells in parallel that do not have a self-switching property, as illustrated in FIG. 10. Three-electrode cell architectures can also be used: FIG. 11 illustrates the fact that a single self-switching cell may provide control for serial and or parallel cells. Examples of single-cell, mid-stack control using a two-electrode, self-switching cell (FIG. 12) or a three-electrode, self-switching cell (FIG. 13) can be made.

Figure 14:
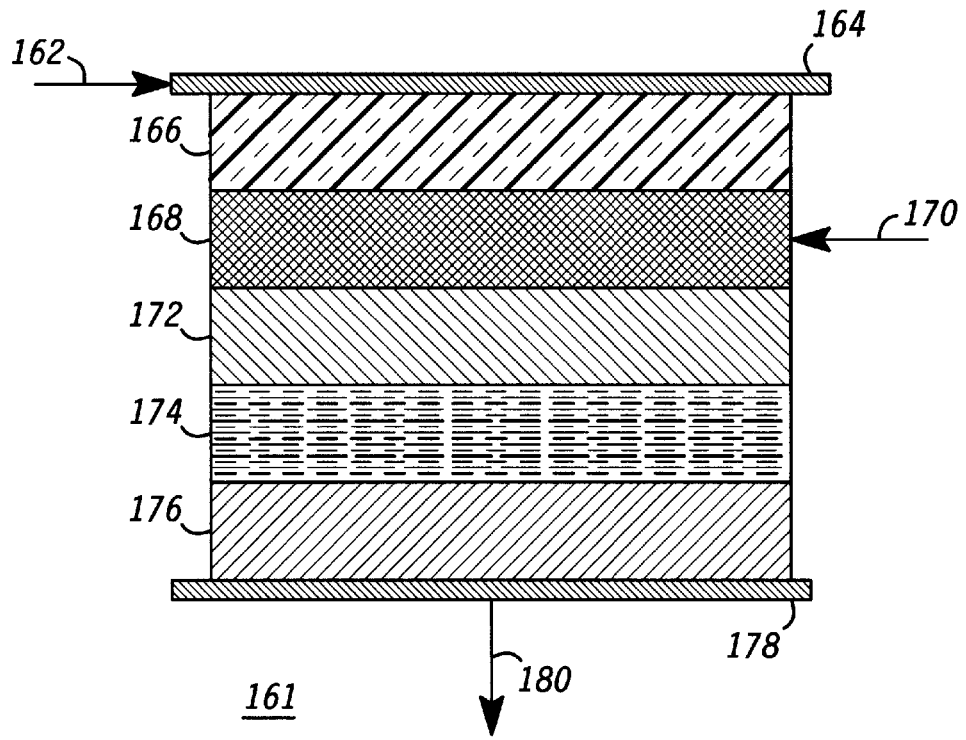
FIG. 14 is a schematic representation of an electrochemical cell (161) having an architecture in accordance with the instant invention. The cell comprises a self-switching component (166) in electrical contact with a first current collector (164) that is electrically connected to a circuit (162) such as a load or charging circuit. The self-switching component is also electrically connected to a second current collector (168) that is electrically connected to a circuit (170) such as a parallel series of cells. In this case, the voltage range for the "on" mode for conductivity of the self-switching component has been chosen to overlap the desired electrical potential range of the electrode. On the opposite face of said second current collector is a first electrode (172) comprised of active material, which is exposed to an electrolyte medium (174) that also is in physical contact with a counterelectrode (176) and optionally in physical contact with said self-switching component (166). Said counterelectrode is in electrical contact with a third current collector (178), which is in turn connected to a circuit (180) such as an electrical load or charging circuit. This configuration, while similar to that of FIG. 1, serves the function of turning off current flow upon overcharge or over-discharge, as opposed to shunting it.
Figure 15:
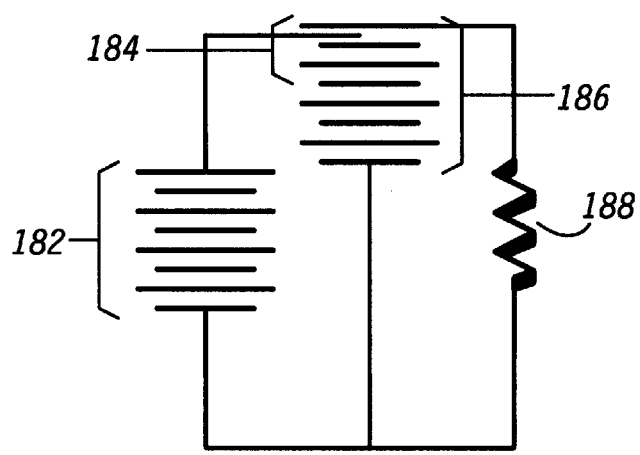
FIG. 15 is a schematic representation of an electrical circuit having an electrochemical cell (184) fabricated in accordance with the instant invention, and in series (186) with cells not made according to the instant invention, as well as in parallel with a stack (182) of cells not made according to the instant invention. An electrical load (188) is also shown in series with cell 184. Cell 184 has a switching architecture such as that shown in FIG. 14, enabling it to reversibly cut off current to both stacks upon overcharge or over-discharge.

While FIG. 1 shows one example of a three-electrode, self-switching cell architecture in which the self-switching cell component feeds current to a shunt, the invention is not so limited. An alternative three-electrode, selfs-witching cell architecture is shown in FIG. 14, and has the advantage that the self-switching element may be used as a voltage-toggled conduit to control the flow of current internally as well as to cells in series and or in parallel: this is illustrated schematically in FIG. 15.

Figure 16:
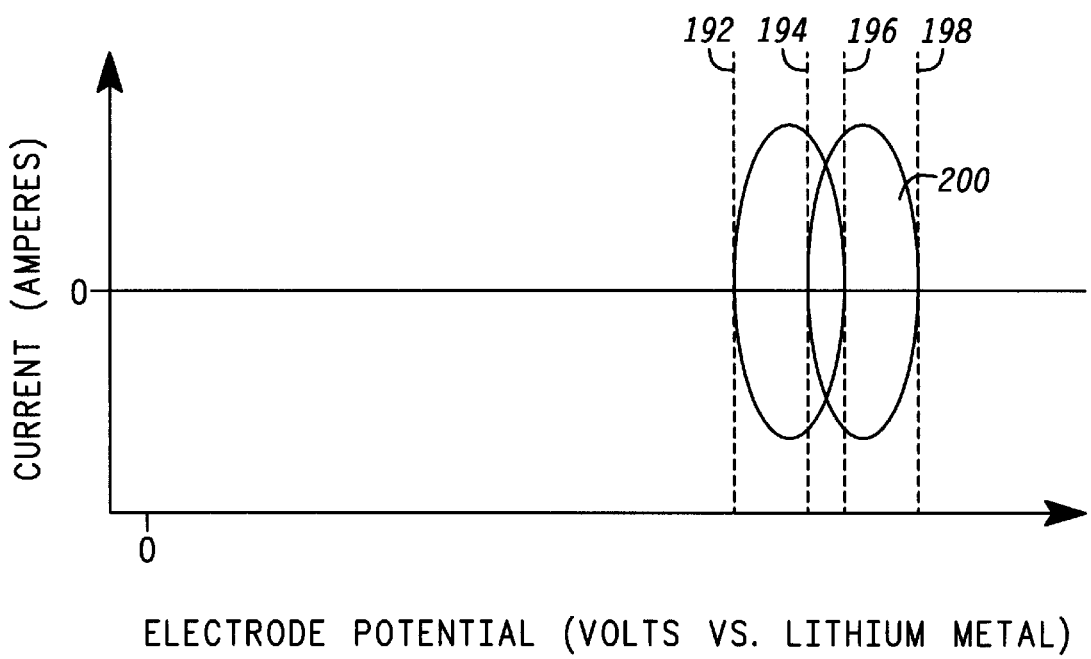
FIG. 16 is a schematic representation of an expanded window (200) of conductivity obtained by mixing two different self-switching component materials, e.g., in an electrode. Whereas the upper limits for the component materials were different (196 and 198, respectively), as were the lower limits (192 and 194, respectively), the mixed materials conduct within the range bounded by lower limit 192 and upper limit 198. To simplify understanding, the range has been shown as the apparent overlap of two windows, but in fact the shape of the new window is really more circular because the conductivity is additive in their overlap region.
Figure 17:
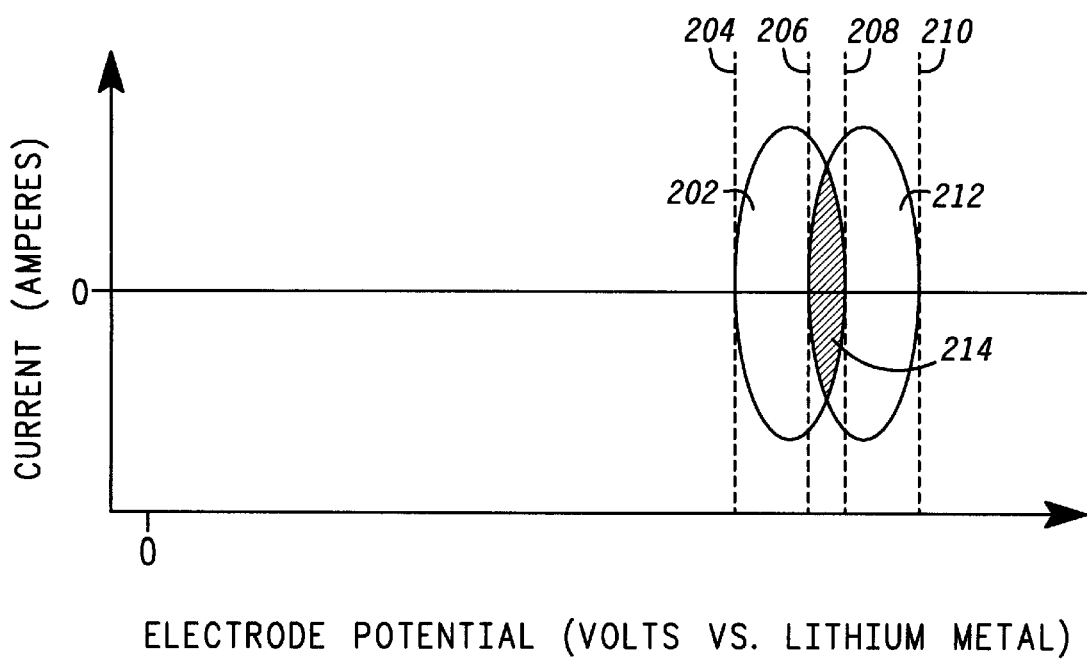
FIG. 17 is a schematic representation of a narrowed window (214) of conductivity obtained by placing two different component self-switching materials in series electrically: the window of those different components are shown as 202 and 212, respectively; their conductive window overlap area is shown as 214. Whereas individually the conductivity upper voltage boundaries are at 208 and 210, respectively, and the conductivity lower voltage boundaries are at 204 and 206, respectively, the new window 214 has a lower voltage boundary 206 and a upper voltage boundary 208 for conductivity.
Figure 18:
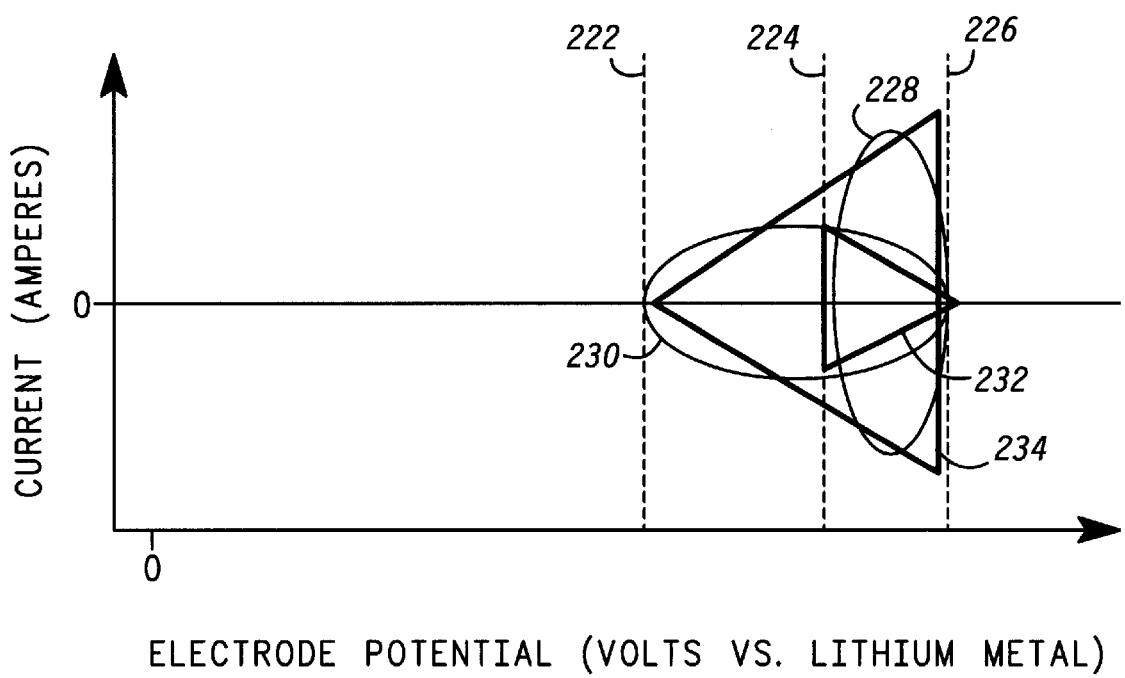
FIG. 18 is a schematic representation illustrating principles of how the shape and other parameters of the conductivity window can be tailored to approximate some desired specification. When two different self-switching materials with windows such as those represented by 230 and 228, respectively, are mixed, a tapering of conductivity occurs at the lower boundary (222) while the upper boundary (226) has a sharp cut-off, resulting in a profile that approximates triangle 234. Mixing different self-switching materials is not unlike placing the different self-switching materials parallel to each other in an electrical circuit If these two different self-switching materials, respectively, are placed in series electrically instead of mixing them, the opposite effect occurs, with a sharp cut-off (224) at the low-voltage boundary, and a tapered conductivity at the upper voltage boundary (226), yielding a profile that approximates triangle 232.

Windows of conductivity for these switch-like phenomena may be customized, for instance, by employing a combination of switch-like materials such that the useful voltage window includes both of their ranges. This is illustrated in FIG. 16, and is comparable to using two conductivity windows in parallel electrically. By contrast, FIG. 17 illustrates the fact that using two conductivity windows in electrical series can be used to obtain a narrower conductivity window. FIG. 18 illustrates the fact that both the "in parallel" and "in series" approaches can be used to tailor the shape of the conductivity window. In some cell control functions it is desirable to have the current taper off, while in others it is important to have a sharp cut-off, and yet typically it is inconvenient to modify the chemistry of conventional energy storage electrodes to achieve desirable current profiles. The instant invention addresses this need.

For a practical example, consider the combination of powdered polythiophene (conductive between 3.8 and 4.8V versus metallic lithium) and powdered polypyrrole (conductive between 3.3 and 4.3V versus metallic lithium). When they are blended into the same composite, one may obtain a cumulative voltage range of 3.3 to 4.8V. If the same two materials are employed segregated in an electrical series, one can define a narrow voltage window of 3.8 to 4.3V for conduction. Analogous permutations may be used to tailor the shape of current-versus-voltage profiles for conductivity windows.

The cells themselves, having a self-switching ability, clearly also impart auxiliary switching functions to the circuits that comprise them. For instance, with the appropriate architecture and external circuit, one may employ a self-switching cell to serve one or more of the following functions: a reversible fuse, a diode, a reverse-biased diode, a resistor, a transistor, and combinations thereof. Example 4 illustrates a reversible fuse for either a direct or alternating current circuit, and Example 5 illustrates a reversible fuse for an alternating current circuit. Example 6 illustrates a light-emitting diode and a reverse-biased diode. Examples 1, 2, 3, and 7 illustrate a transistor.

Self-switching cells can also be employed as resistors. FIG. 8 shows that the decline of conductivity from its peak value to approximately zero is not instantaneous: the decline is a curve that slopes relative to voltage. Thus modulating the voltage (and thereby the state of charge) across current collectors 12 and 20 in FIG. 1 modulates the degree of electrical resistance between circuit 2 and circuit 4 in FIG. 1, and one has obtained a varistor. In combination with data on voltage (since the conductivity window has two voltage boundaries, both with varistor-producing properties), the resistance value can be used as a sensitive indication of the state of charge (or "fuel gauge" in battery industry parlance) for the self-switching cell.

These auxiliary functions are particularly useful in circuit segments for which the inclusion of energy storage cells is already contemplated, such as those shown in FIGS. 10, 11, 12, 13, and 15, but the invention is not so limited.

The invention may employ compressed powders, solution-cast films, molded articles, or other items comprising self-switching materials, and these may be used in electrochemical cells configured as flat laminates, cylindrical or prismatic winds, candy ribbon shapes, or other arrangements. The electrolyte media may be an aqueous solution, non-aqueous organic solution, ceramic, solvent-free polymer, polymer gel, low-melting salt, or other format. The self-switching cell may employ electrode pairs such as are used in lithium ion cells, nickel metal hydride cells, nickel cadmium cells, capacitor cells, electrochromic cells, fuel cells, photovoltaic cells, or other types of electrochemical cells.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An structure for self-regulating cells, said structure comprising the elements of:

an electrolyte medium;

a first energy storage electrode that is exposed to said electrolyte medium;

a second energy storage electrode that is exposed to said electrolyte medium;

a third electrode; and an article comprised of self-switching material, said article being in electrical contact with said third electrode and at least one of said first and said second energy storage electrodes, wherein the conductivity of the self-switch material becomes nonconductive or semi-conductive outside a voltage window.

2. An structure as described in claim 1, wherein said first energy storage electrode comprises a material selected from the group consisting of graphite, coke, amorphous carbon, buckminsterfullerenes, metallic lithium, lithium alloys, lithium titanium sulfide, lithium titanium oxide, lithium tin oxide, and combinations thereof.

3. An structure as described in claim 1, wherein said second energy storage electrode comprises a material selected from the group consisting of lithium cobalt oxide, lithium manganese oxide, lithium nickel oxide, lithium vanadium oxide, graphite, coke, amorphous carbon, lithium titanium sulfide, lithium titanium oxide, lithium molybdenum sulfide, lithium titanium oxide, poly(organic disulfides), polypyrrole, polythiophene, poly(phenylene vinylene), polyphenylene, polyacetylene, and combinations thereof.

4. An structure as described in claim 1, wherein said third electrode comprises an electrical lead comprised of a material selected from the group consisting of a metal, an electrically conductive carbon, and combinations thereof.

5. An structure as described in claim 1, wherein said self-switching material comprises a substance selected from the group consisting of polypyrrole, polythiophene, poly(3-(4-fluorophenyl)-thiophene), poly(phenylene vinylene), polyphenylene, polyacetylene, polyaniline, silicon, carbon, gallium, germanium, and combinations thereof.

6. An architecture for self-regulating cells, said structure comprising the elements of:

an electrolyte medium;

a first energy storage electrode that is exposed to said electrolyte medium;

a second energy storage electrode that is exposed to said electrolyte medium; and an article comprised of a self-switching material, said article being in electrical contact with said first and said second energy storage electrodes, wherein the conductivity or the self-switching material becomes nonconductive of semi-conductive outside a voltage window.

7. An structure as described in claim 6, wherein said first energy storage electrode comprises a material selected from the group consisting of graphite, coke, amorphous carbon, buckminsterfullerenes, metallic lithium, lithium alloys, lithium titanium sulfide, lithium titanium oxide, lithium tin oxide, and combinations thereof.

8. An structure as described in claim 6, wherein said second energy storage electrode comprises a material selected from the group consisting of lithium cobalt oxide, lithium manganese oxide, lithium nickel oxide, lithium vanadium oxide, graphite, coke, amorphous carbon, lithium titanium sulfide, lithium titanium oxide, lithium molybdenum sulfide, lithium titanium oxide, poly(organic disulfides), polypyrrole, polythiophene, poly(phenylene vinylene), polyphenylene, polyacetylene, and combinations thereof.

9. An structure as described in claim 6, wherein said self-switching material comprises a substance selected from the group consisting of polypyrrole, polythiophene, poly(3-(4-fluorophenyl)-thiophene), poly(phenylene vinylene), polyphenylene, polyacetylene, polyaniline, silicon, carbon, gallium, germanium, and combinations thereof.

10. An architecture for self-regulating cells, said structure comprising the elements of:
  an electrolyte medium;
  a first energy storage electrode that is exposed to said electrolyte medium;
  a second energy storage electrode that is exposed to said electrolyte medium; and
  an electronically conductive medium comprised of a self-switching material, said electronically conductive medium serving as a primary conduit for exchange of electronic current by at least one of said first and said second energy storage electrodes, wherein the conductivity or the self-switching material becomes nonconductive of semi-conductive outside a voltage window.

11. An structure as described in claim 10, wherein said first energy storage electrode comprises a material selected from the group consisting of graphite, coke, amorphous carbon, buckminsterfullerenes, metallic lithium, lithium alloys, lithium titanium sulfide, lithium titanium oxide, lithium tin oxide, and combinations thereof.

12. An structure as described in claim 10, wherein said second energy storage electrode comprises a material selected from the group consisting of lithium cobalt oxide, lithium manganese oxide, lithium nickel oxide, lithium vanadium oxide, graphite, coke, amorphous carbon, lithium titanium sulfide, lithium titanium oxide, lithium molybdenum sulfide, lithium titanium oxide, poly(organic disulfides), polypyrrole, polythiophene, poly(phenylene vinylene), polyphenylene, polyacetylene, and combinations thereof.

13. An structure as described in claim 10, wherein said self-switching material comprises a substance selected from the group consisting of polypyrrole, polythiophene, poly(3-(4-fluorophenyl)-thiophene), poly(phenylene vinylene), polyphenylene, polyacetylene, polyaniline, silicon, carbon, gallium, germanium, and combinations thereof.

14. An electrical switch comprised of a self-regulating cell, wherein said self-regulating cell possesses an structure comprising the elements of:
  an electrolyte medium;
  a first energy storage electrode that is exposed to said electrolyte medium;
  a second energy storge electrode that is exposed to said electrolyte medium; and
  an article comprised of self-switchig material, said article being in electrical contact with said third electrode and at least one of said first and said second energy storage electrodes, wherein conductivity of the self-switching material becomes nonconductive or semi-conductive outside a voltage window.

15. An structure as described in claim 14, wherein said switch serves in the same manner as an electrical element selected from the group consisting of a reversible fuse, a diode, a reverse-biased diode, a resistor, a transistor, and combinations thereof.

16. An electrical switch comprised of a self-regulating cell, wherein said self-regulating cell possesses an structure comprising the elements of:
  an electrolyte medium;
  a first energy storage electrode that is exposed to said electrolyte medium;
  a second energy storage electrode that is exposed to said electrolyte medium; and
  an article comprised of a self-switching material, said article being in electrical contact with said first and second energy storage electrodes.

17. An structure as described in claim 16, wherein said switch serves in the same manner as an electrical element selected from the group consisting of a reversible fuse, a diode, a reverse-biased diode, a resistor, and combinations thereof.

18. An electrical switch comprised of a self-regulating cell, wherein said self-regulating cell possesses an structure comprising the elements of:
  an electrolyte medium;
  a first energy storage electrode that is exposed to said electrolyte medium;
  a second energy storage electrode that is exposed to said electrolyte medium; and
  an electronically conductive medium comprised of a self-switching material, said electrically conductive medium serving as a primary conduit for exchange of electronic current by at least one of said first and said second energy storage electrodes.

19. An structure as described in claim 18, wherein said switch serves in the same manner as an electrical element selected from the group consisting of a reversible fuse, a diode, a reverse-biased diode, a resistor, and combinations thereof.

* * * * *